Aug. 12, 1952     I. S. LIME     2,606,697
MEASURING APPARATUS FOR BEVERAGE BREWING MACHINES
Original Filed Nov. 10, 1943     3 Sheets-Sheet 1

I. S. Lime
INVENTOR
BY *C. A. Snow & Co.*
ATTORNEYS.

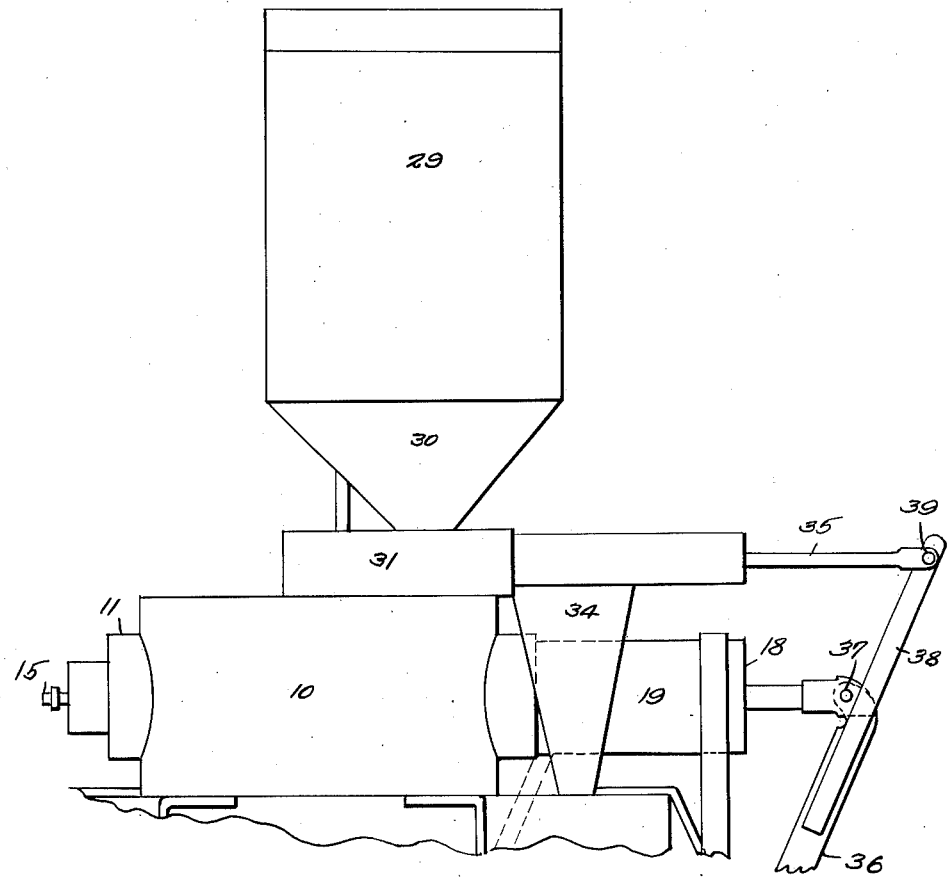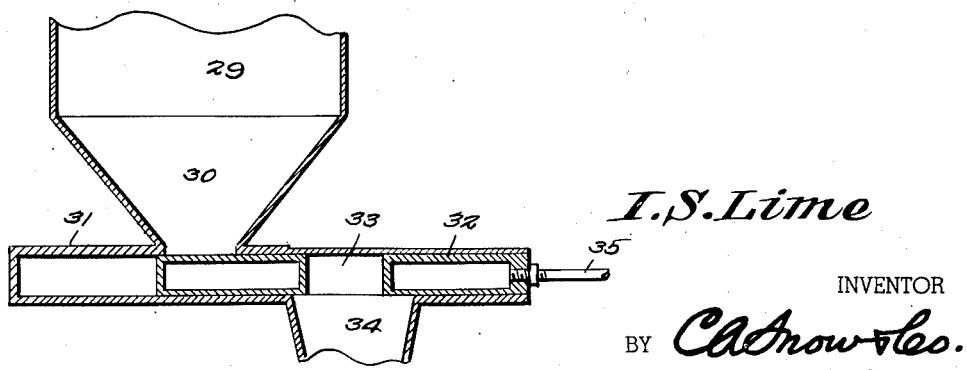

Aug. 12, 1952     I. S. LIME     2,606,697

MEASURING APPARATUS FOR BEVERAGE BREWING MACHINES

Original Filed Nov. 10, 1943     3 Sheets-Sheet 3

I. S. Lime
INVENTOR

BY *CA Snow & Co.*
ATTORNEYS.

Patented Aug. 12, 1952

2,606,697

UNITED STATES PATENT OFFICE 2,606,697

MEASURING APPARATUS FOR BEVERAGE BREWING MACHINES

Iola S. Lime, Kansas City, Mo.

Original application November 10, 1943, Serial No. 509,775, now Patent No. 2,433,054, dated December 23, 1947. Divided and this application November 13, 1947, Serial No. 785,721

1 Claim. (Cl. 222—340)

This invention relates to a measuring apparatus for a beverage-brewing and vending machine, and more particularly, is a division of my copending application, covering a beverage-brewing and vending machine, filed November 10, 1943, and bearing Serial Number 509,775, now Patent No. 2,433,054 issued Dec. 23, 1947.

The parent application has reference to a machine which in its entirety is adapted to brew automatically and vend individual cups of coffee, cocoa, or the like.

The present application relates to that portion of the machine designed to deliver automatically measured quantities of water and of granulated material such as coffee, to a transfer receptacle positioned at a filling station. The path of said receptacle and of the material delivered thereto, after it leaves the filling station, has been described in detail in the parent application, and will not be covered herein.

The primary object of the present invention is to provide a means capable of being made a part of a machine of the type stated, whereby an automatic measurement of a quantity of granulated or powdered material, and of a quantity of liquid, is made simultaneously, with said measured quantities being simultaneously delivered to the transfer receptacle.

It is a further important object of the invention to provide an actuating means for this portion of the brewing machine, which can be made part of a linkage system extending to the various operating parts of the machine, so that the operation of the whole machine, including the device which is the subject of this application, can be coin or check controlled if desired.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 2 is a side elevational view thereof.

Figure 5 is a longitudinal vertical section through the solid-measuring portion, parts being broken away.

Figure 1:
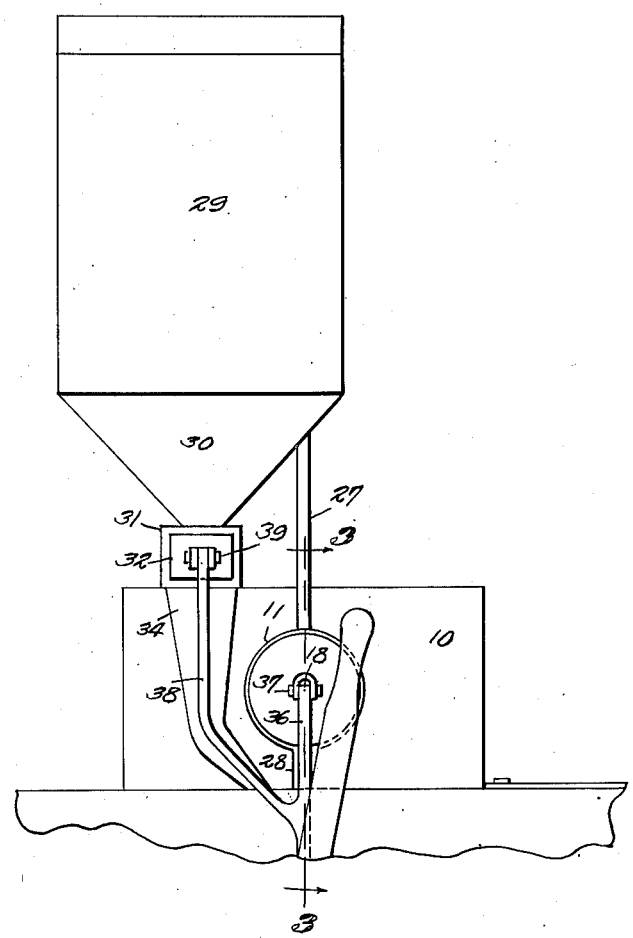
Figure 1 is a front elevational view of the measuring apparatus which is the subject of the present application.

Referring to the drawings in detail, the reference character 5 designates a portion of the supporting frame for the beverage-brewing and vending machine. Mounted thereon is a water container 6 of suitable capacity, preferably surrounded by insulation 7, which can be asbestos or other material having the desired insulating properties. A supply pipe 8 extends into the water container, for the purpose of keeping it filled, this pipe leading from a supply tank or other suitable source, not shown.

An electric heating element 9 is contained in the water container 6, and is adapted to maintain water within the container at the boiling point. This can be accomplished by thermostatic controls in a manner well known to those skilled in the art, and no attempt has been made herein to illustrate or describe said controls, since means of this type are well known.

The water container 6 includes an upwardly extended dome 10, which is preferably of cylindrical formation. In the upper portion of the dome 10 is located a cylindrical outer valve casing 11. This is provided near one end with a plurality of inlet openings 12 whereby water is free to flow from the water container into the valve casing. That end of the casing 11 nearest the openings 12 is closed by a head 13 having a gland 14 in which is tightly fitted a slidable rod 15. Fixedly secured to rod 15 intermediate its ends is a piston 16.

Rod 15 is extended longitudinally through a secondary piston 17 slidably mounted thereon, and thence through a head 18 which closes the outer end of a cylindrical inner casing member 19.

The inner end of the casing member 19 provides a seat 20 for engagement by the piston 16. Fixedly secured to the rod 15 is a collar 21, that constitutes a stop for limiting the movement of the secondary piston 17 in one direction on the rod. The secondary piston 17 is held normally pressed against the collar by a spring 22 mounted on the rod 15 between the secondary piston and the head 18.

Stop pins 23 constitute means for limiting the movement of the secondary piston 17 toward the openings 12 under the action of the spring 22.

Figure 3:
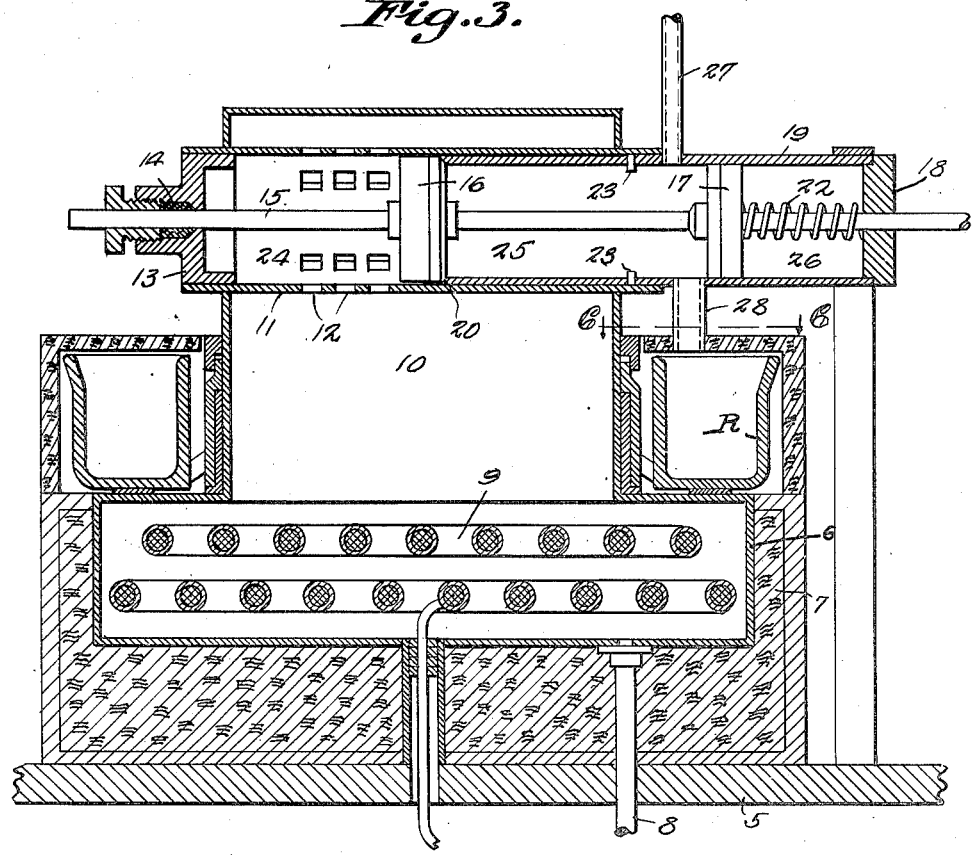
Figure 3 is an enlarged section on line 3—3 of Figure 1.

Under normal conditions, the two pistons are located as in Figure 3, so that the interior of the valve casing is thus divided into an end chamber 24, a measuring chamber 25, and an end chamber 26. When the parts are in this position, the water filling the dome 10 will, of course, fill the end chamber 24.

A vent tube 27 extends upwardly from the measuring chamber 25 to a point well above the dome of the water container, and an outlet tube 28 is extended downwardly from the measuring chamber at a point close to the normal position of the secondary piston. This is shown clearly in Figure 3.

At 29 is illustrated a container for holding such material as ground coffee or other granular or powdered material to be used in brewing the particular beverage. This container is provided with a bottom in the form of an outlet hopper 30 which, as shown in Figure 5, opens into the top of a casing 31 containing a measuring valve 32. This valve is in the form of a slide having an opening 33 normally positioned above, and opening into, a delivery spout 34. When the slide is moved away from normal position within the casing 31, the opening 33 is brought into register with the outlet in the bottom of the hopper 30, so that the opening will thus be filled with a predetermined amount of the material contained within the hopper. Thereafter, when the valve 32 is returned to normal position, the measured amount of said material will be brought to a point above the spout 34 and delivered thereinto by gravity. At this time, the outlet of the hopper 30 is closed by the valve. This will be apparent by referring to Figure 5. A stem 35 extends from the slide 32 for the purpose of transmitting the required movement thereto.

At 36 I have illustrated a portion of a lever which is part of a coordinated linkage whereby, in timed coordination, not only the measuring apparatus described herein is operated, but also the other parts of the machine considered as a whole. This is described in detail in my parent application referred to above. Lever 36 is pivotally connected to the rod 15 at 37, and is provided with an angular extension 38 (Figure 1) pivotally connected to the stem 35, as at 39. In this way, lever 36, while cooperating with other parts of said linkage, is adapted to operate simultaneously the means described herein for measuring and delivering predetermined quantities of liquids and granular material.

Figure 4:
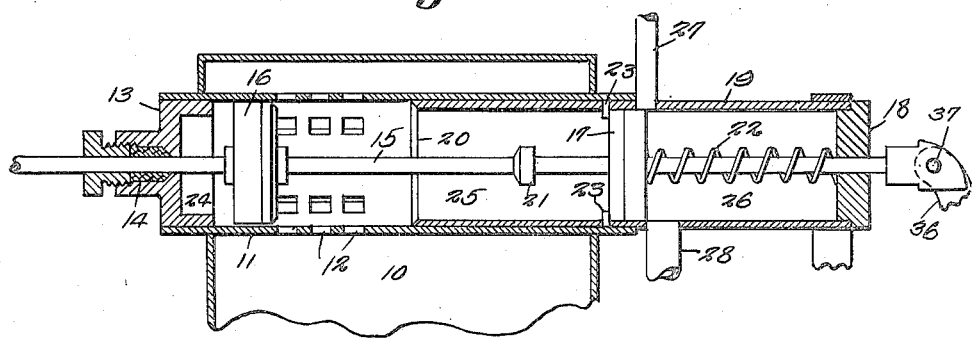
Figure 4 is a section, taken on the same plane, showing operating parts of the liquid-measuring portion of the device in one extreme position.

In practice, the lever 36 and its extension 38 are normally in the position shown in Figure 2, and when in this position, said lever means holds the parts of the respective portions of the apparatus in the normal positions illustrated in Figures 3 and 5. Movement of the lever means to the left in Figure 2 operates on the liquid-measuring portion to move the piston 16 to the opposed extreme position shown in Figure 4. During the first part of the travel of this piston, the secondary piston 17 moves to the left in Figure 3, under the action of the spring 22. During the movement of the secondary piston, it crosses over the outlet spout 28, and comes to a stop against the stop pins 23, as shown in Figure 4. The piston 16, in the meantime, continues to move to the left until it is in the extreme position shown in Figure 4.

This action causes water to rush into the valve casing through the inlet openings 12, and to fill entirely the space between the piston 16 and secondary piston 17 as they appear in Figure 4.

As the lever means begins moving back to normal position, piston 16 passes across the inlet openings 12, and at the time it has closed off the last opening, that is, that series of openings disposed furthest to the right in Figure 4, the stop collar 21 engages the secondary piston 17. The liquid trapped between the two pistons at this point of travel is a measured quantity of liquid. Completion of the travel of the two pistons to the right brings piston 16 against its seat 20, and opens the outlet spout 28.

Figure 6:
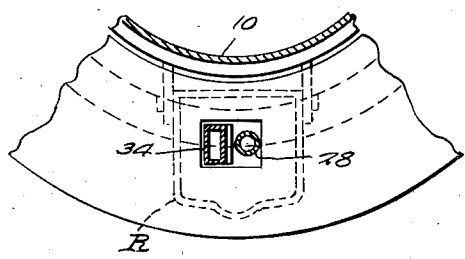
Figure 6 is a section on line 6—6 of Figure 3.

At the same time the outlet spout 28 is opened, the opening 33 of the slide 32 is brought to position above the discharge spout 34. Thus, there is simultaneous delivery of the water and the granular material to a tranfer receptacle R, that is described in detail in the parent application. Referring to Figure 6, it is seen that the respective spouts 28 and 34 are positioned in side-by-side relation at their delivery ends, so that a positive and simultaneous delivery of the materials is made to the transfer receptacle while it is positioned at the filling station.

What is claimed is:

In a beverage dispenser an elongated horizontally disposed cylindrical valve casing having liquid inlet openings extending therethrough adjacent one end thereof, an elongated cylindrical inner casing extending into the valve casing through the end thereof remote from the inlet openings and forming a valve seat within the valve casing adjacent the inlet openings, said inner casing having a discharge opening extending therethrough adjacent the end of the valve casing remote from the inlet openings, an elongated push rod carried by the casings to move longitudinally therethrough, a valve carried by the push rod for movement therewith between the valve seat and the end of the valve casing adjacent the inlet openings, a stop collar carried by the push rod for longitudinal movement therewith intermediate the ends of the inner casing, a second piston mounted on the push rod for longitudinal movement thereon between the end of the inner casing remote from the seat and the stop collar, a compression spring encircling the push rod between the last named piston and the end of the inner casing remote from the seat for yieldingly urging the last named piston into engagement with the stop collar, and stop pins carried by the inner casing and projecting into the path of movement of the last named piston between the discharge opening and the seat to limit the movement of the last named piston under the influence of the spring.

IOLA S. LIME.

REFERENCES CITED

The following references are of record in the file of this patent:

UNITED STATES PATENTS

| Number | Name | Date |
|---|---|---|
| 840,686 | Brook | Jan. 8, 1907 |
| 933,528 | Bruce | Sept. 7, 1909 |
| 1,110,135 | Henderson | Sept. 8, 1914 |
| 1,268,820 | DePew et al. | June 11, 1918 |
| 1,870,188 | Abrams | Aug. 2, 1932 |
| 2,433,054 | Lime | Dec. 23, 1947 |
| 2,464,030 | Engstrom | Mar. 8, 1949 |

FOREIGN PATENTS

| Number | Country | Date |
|---|---|---|
| 259,251 | Germany | Apr. 30, 1913 |
| 343,214 | Great Britain | Feb. 19, 1931 |